US012104782B1

(12) United States Patent
Rashidi Doust

(10) Patent No.: US 12,104,782 B1
(45) Date of Patent: Oct. 1, 2024

(54) ACOUSTIC PANEL WITH LED LIGHT FIXTURE

(71) Applicant: Elite Lighting, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 18/369,580

(22) Filed: Sep. 18, 2023

Related U.S. Application Data

(60) Provisional application No. 63/461,185, filed on Apr. 21, 2023.

(51) Int. Cl.

| | |
|---|---|
| ***F21S 8/04*** | (2006.01) |
| ***F21V 33/00*** | (2006.01) |
| ***G10K 11/00*** | (2006.01) |
| *F21Y 103/20* | (2016.01) |
| *F21Y 115/10* | (2016.01) |

(52) U.S. Cl.

CPC ............ *F21V 33/006* (2013.01); *F21S 8/043* (2013.01); *G10K 11/002* (2013.01); *F21Y 2103/20* (2016.08); *F21Y 2115/10* (2016.08)

(58) Field of Classification Search

CPC . F21S 8/043; F21S 8/046; F21S 8/026; F21V 21/041; F21V 21/048; F21V 33/006; E04B 9/067; E04B 9/345; F21K 9/20

See application file for complete search history.

(56) References Cited

U.S. PATENT DOCUMENTS

| | | | | |
|---|---|---|---|---|
| 7,175,296 | B2 * | 2/2007 | Cok | E04B 9/003 362/147 |
| 7,645,052 | B2 * | 1/2010 | Villard | F21S 4/28 362/147 |
| 8,096,671 | B1 * | 1/2012 | Cronk | F21S 2/005 362/147 |
| 8,177,385 | B2 * | 5/2012 | Porciatti | F21V 29/763 362/147 |
| 8,215,787 | B2 * | 7/2012 | Mathai | E04B 9/241 362/330 |
| 8,915,636 | B2 * | 12/2014 | Araki | F21V 23/001 362/147 |
| 8,967,823 | B2 * | 3/2015 | D'Antonio | F21V 21/04 362/147 |
| 9,534,382 | B2 * | 1/2017 | White | E04B 9/006 |
| 9,951,916 | B2 * | 4/2018 | Oleske | E04B 9/241 |
| 10,030,850 | B2 * | 7/2018 | Vissenberg | F21V 9/45 |
| 10,087,627 | B2 * | 10/2018 | Booij | F21V 33/0088 |
| 10,125,934 | B1 * | 11/2018 | Zhang | F21V 29/89 |
| 10,145,545 | B2 * | 12/2018 | Farrnbacher | F21V 19/001 |
| 10,190,738 | B1 * | 1/2019 | James | F21S 4/28 |
| 10,371,332 | B2 * | 8/2019 | Bailey | F21V 3/00 |
| 10,774,529 | B2 * | 9/2020 | Evans | F21V 21/041 |
| 11,060,675 | B2 * | 7/2021 | Laluet | G10K 11/162 |
| 11,396,751 | B2 * | 7/2022 | Yeo | F21V 21/03 |
| 11,402,073 | B1 * | 8/2022 | McMillan | A61L 9/20 |
| 11,536,422 | B2 * | 12/2022 | Bartella | F21S 8/026 |
| 2011/0103043 | A1 * | 5/2011 | Ago | F21V 21/04 362/147 |
| 2013/0301249 | A1 * | 11/2013 | Ngai | E04B 9/0435 362/147 |

(Continued)

*Primary Examiner* — Ismael Negron

(74) *Attorney, Agent, or Firm* — Payam Moradian

(57) ABSTRACT

A light fixture a rectangular acoustic panel configured to be attached to a T-bar, and a frame with light sources configured to be placed around the acoustic panel, such that the light sources emit light from all four sides of the acoustic panel.

17 Claims, 5 Drawing Sheets

(56) References Cited

U.S. PATENT DOCUMENTS

| | | | | |
|---|---|---|---|---|
| 2014/0036503 | A1* | 2/2014 | Olsen | F21V 21/048<br>362/249.02 |
| 2014/0071671 | A1* | 3/2014 | Tseng | F21S 8/046<br>362/235 |
| 2016/0369972 | A1* | 12/2016 | Thijssen | F21V 7/0008 |
| 2023/0122405 | A1* | 4/2023 | Allen | E04B 9/241<br>250/492.1 |

* cited by examiner

ACOUSTIC PANEL WITH LED LIGHT FIXTURE

CROSS-REFERENCE

The present application claims the benefit of provisional application No. 63/461,185, filed on Apr. 21, 2023, which is incorporated herein by reference in its entirety.

SUMMARY SECTION OF THE INVENTION

Provided is an acoustic light fixture comprising: an acoustic panel with a rectangular or square profile configured to be attached to a T-bar; a frame with light sources configured to be placed around the acoustic panel; wherein the frame with the light sources emits light from all four sides of the acoustic panel. The acoustic panel can be a square. The light sources can be LED light sources. a first back support for the acoustic panel and a second back support for the frame, wherein the first and the second back supports are configured to the placed above the T-Bar. The first and the second back supports can have a longer width on all four sides in a horizontal direction than a rectangular opening created by the T-bar. The first and the second back supports can be in form of a ledge. The back support for the frame can be placed immediately above the frame. The back support for the frame can be placed in between a body of the acoustic panel and the support for the acoustic panel. The back frame for the acoustic panel and a body of the acoustic panel can be joined together through a vertical portion. The frame can be placed around the vertical portion of the acoustic panel. The frame can come below the T-bar to a maximum of 3 inches in a vertical direction. The acoustic panel can go further below the frame. The acoustic panel can have a body comprised of a plurality of portions with straight sides. The acoustic panel can be made from wool, fiber glass, cellulose, or foam.

Provided is an acoustic light fixture comprising: an acoustic panel with a square profile configured to be attached to a T-bar, the acoustic panel having a back support, a body, and a vertical portion connecting the ledge and the body; a square frame with light sources configured to be placed around the vertical portion of the acoustic panel; wherein the frame with the light sources emits light from all four sides of the acoustic panel. The acoustic light fixture can include a first back support for the acoustic panel and a second back support for the frame, wherein the first and the second back supports are configured to the placed above the T-Bar. The first and the second back support can have a longer width on all four sides in a horizontal direction than a rectangular opening created by the T-bar. The first and the second back supports can be in form of a ledge. The back support for the frame can be placed in between a body of the acoustic panel and the support for the acoustic panel.

Provided is an acoustic light fixture comprising: an acoustic panel with a square profile configured to be attached to a T-bar, the acoustic panel having a back support, a body, and a vertical portion connecting the back support and the body; a square frame with light sources configured to be placed around the vertical portion of the acoustic panel, the square from having a back support, wherein the back support of the acoustic panel is placed above the back support of the frame; wherein the frame with the light sources emits light from all four sides of the acoustic panel.

DETAILED DESCRIPTION OF THE INVENTION

Figure 1:
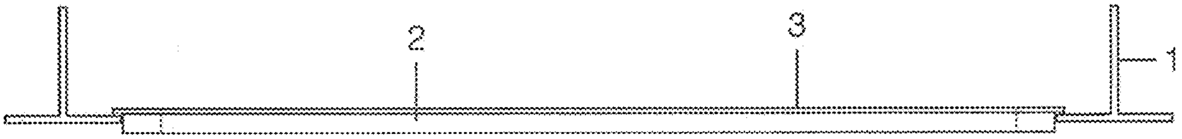
FIG. 1 illustrates a side view of an LED frame resting on a T-bar.

Provided is an acoustic light comprising an acoustic panel 4 configured to be attached to a T-bar 1 and a source of light, such as LED (Light Emitting Diode) light sources, around the acoustic panel 4. The source of light can be in form of a frame 2 containing LED light sources. The frame 2 can have a back support 3, such as a metal support, that keeps the frame 2 attached to the T-bar 1. The acoustic panel 4 can have a square profile. The acoustic panel 4 can have a back support 5 that is configured to keep the acoustic panel 4 at the T-bar 1. The metal back support 3 of frame 2 can be placed below the back support 5 of the acoustic panel 4. Frame 2 can have a large square opening configured to receive the acoustic panel 4. The sources of light can be LED light sources placed on LED boards, and having lenses, and placed around all four sides of the acoustic panel 4 in the form of frame 2. The acoustic panel 4 can extend lower from the frame 2. The acoustic panel 4 is made of one or more materials that absorb sound, such as mineral wool, fiber glass, cellulose, open cell foam, foam, or any combinations thereof.

FIG. 1 illustrates a side view of frame 2. Frame 2 as illustrated is a square. Other rectangular shapes, depending on the shape of T-bar 1 opening, can be used. Frame 2 has a back support 3 that comes further out to create a ledge, which is a narrow outer portion. The ledge of the back support 3 rests on the T-bar 1. The back support 3 is often made from metal, such as aluminum or steel. Frame 2 and its back support 3 can be two separate pieces that are attached together, or could be a one mold design. Each side of the frame 2 can have an LED board with a plurality of LED light sources. The frame 2 can have a power management unit, and a cord to bring in electrical power.

Figure 2:
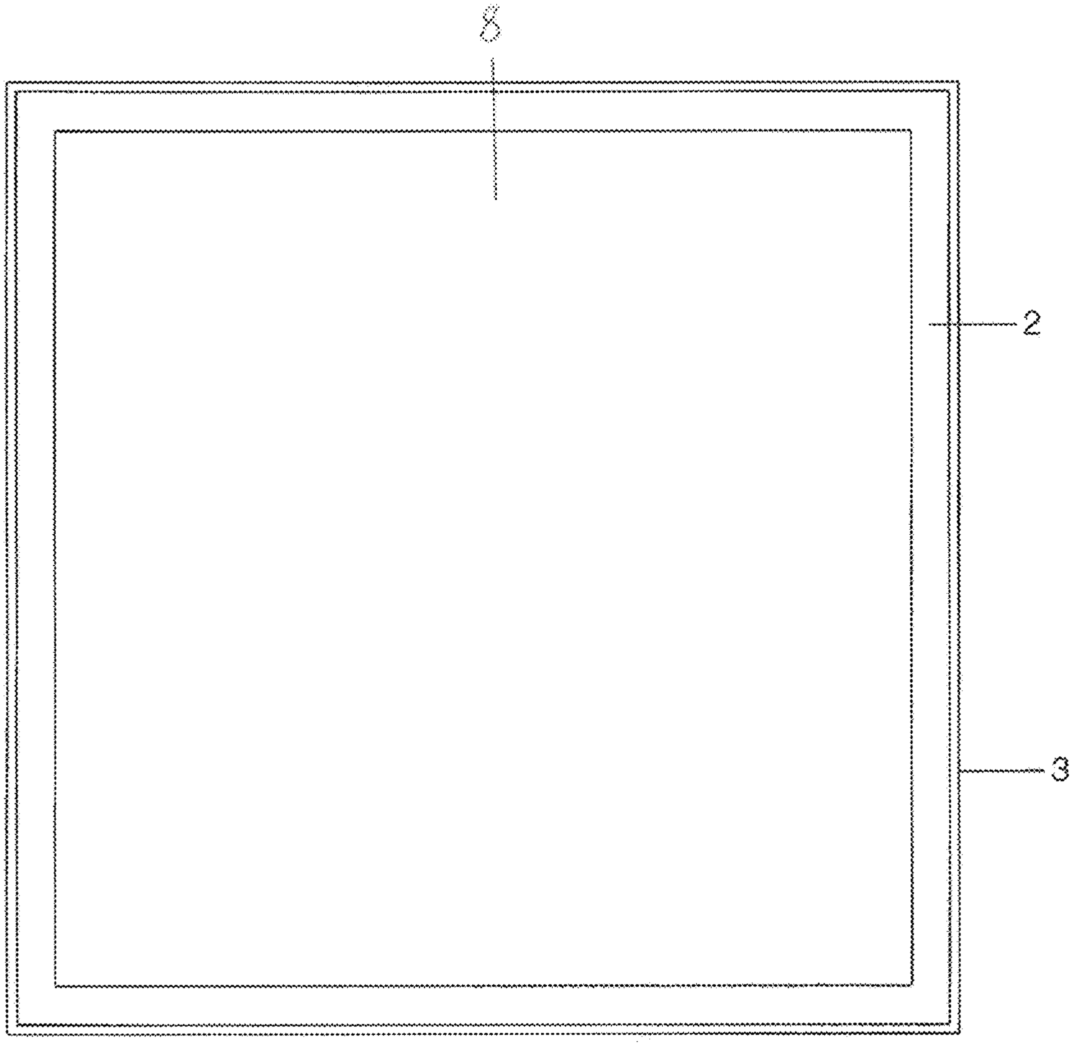
FIG. 2 illustrates a bottom view of the LED frame.

FIG. 2 is a bottom view of frame 2. Visible in this view is the lens 8 of the frame 2 behind which the LED light sources are placed. The back support 3 comes out further than the lens to the outer sides, and provides a ledge for the frame 2 to rest on. The lens 8 of frame 2 can face only downwardly, face only sideways, or alternatively face both downwardly and sideways, particularly to the outside and away from the acoustic panel 4.

Figure 3:
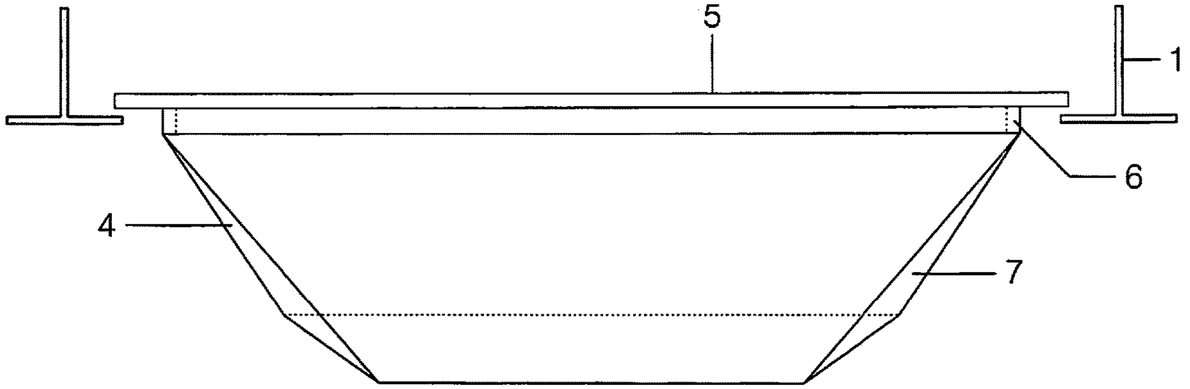
FIG. 3 illustrates a side view of the acoustic panel.
Figure 4:
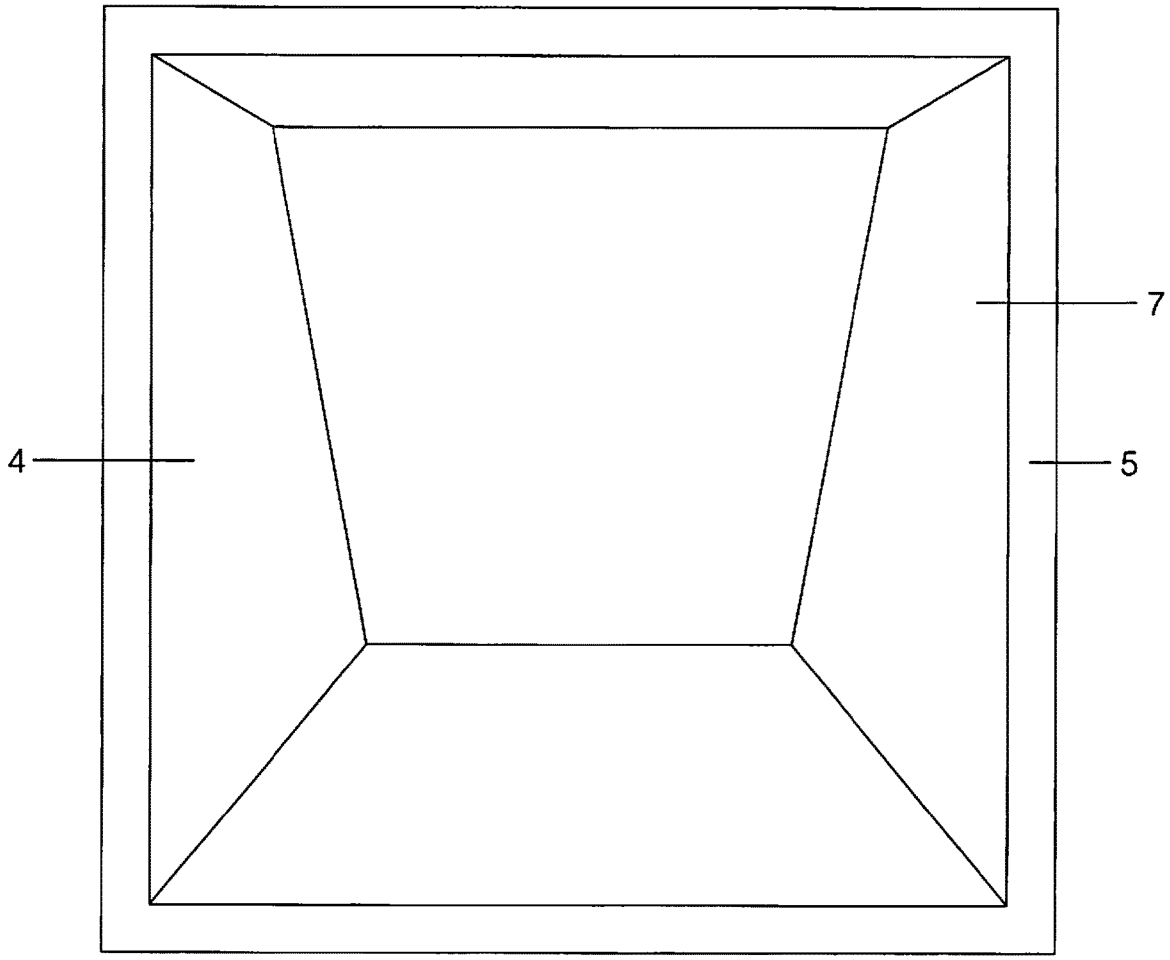
FIG. 4 illustrates a bottom view of the acoustic panel.

FIG. 3 illustrates a side view of acoustic panel 4. Illustrated in this view are back support 5, vertical portion 6, and acoustic body 7. The acoustic panel 4 attaches to the T-bar 1. FIG. 4 illustrates a view of the bottom of the acoustic panel 4. The different parts of the acoustic panel 4 can be made of the same or different materials.

Figure 5:
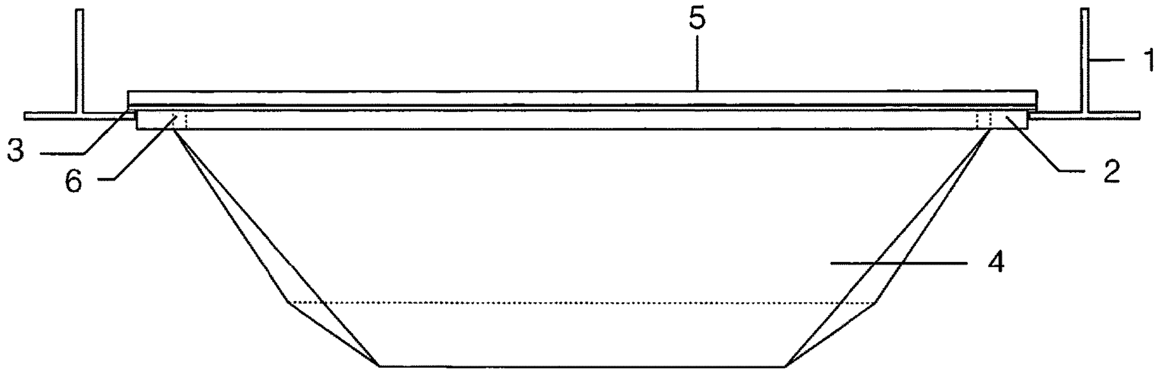
FIG. 5 illustrates a side view of the acoustic panel with the LED frame.

FIG. 5 illustrates a side view of the acoustic light fixture. Illustrated in this view is the side of frame 2, which is held at the level of the T-bar 1 by the back support 3 above it that rests on the T-bar 1. Frame 2 is at the level of the T-bar 1 and slightly extends down (such as up to three inches, or one two inches.) from the T-bar 1 depending on the thickness of the T-bar 1. The acoustic panel 4 comes below frame 2 and is connected to a back support 3 that rests above the T-bar 1. The back support 5 for the acoustic panel 4 can be placed above the support for the frame 2. The back support 5 of the acoustic panel 4 can be connected to the acoustic panel 4 through a vertical portion 6 illustrated with dashed lines. Frame 2 can be placed all around the vertical portion 6 of the acoustic panel 4.

Figure 6:
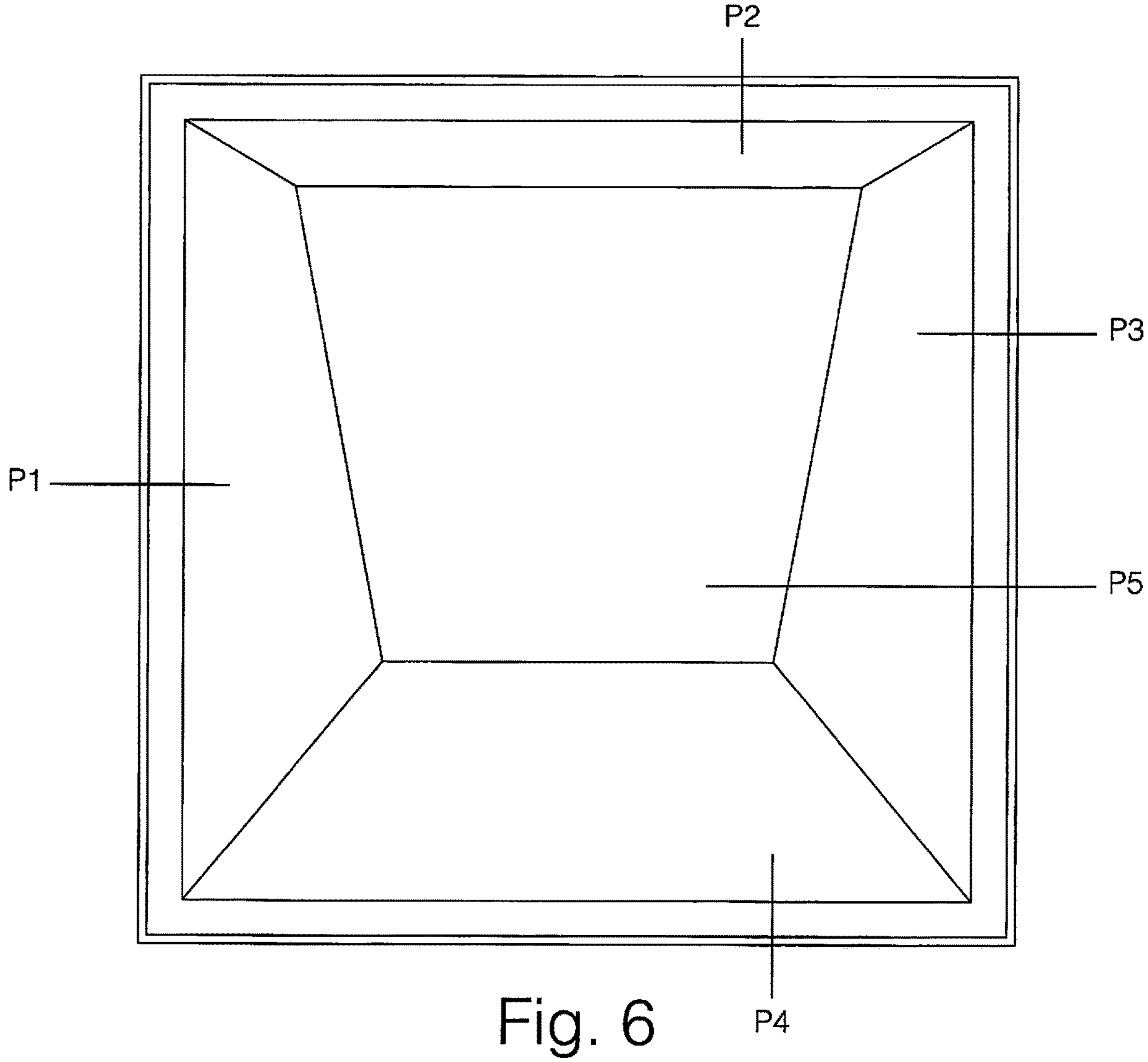
FIG. 6 illustrates a bottom view of the acoustic panel with the LED frame.

FIG. 6 illustrates a bottom view of the acoustic light fixture. Illustrated in this view is the sharp angled design of the acoustic panel 4 and the frame 2 on the side of the acoustic panel 4. The frame 2 extends further to the side of the body 7 of the acoustic panel 4. The acoustic panel 4 in this case is made from five portions (P1, P2, P3, P4, P5), where each portion is formed by four straight lines. A pair of two identical portions (P1 and P3) (P2 and P4) are placed on opposite sides of the square. The bottom part of the four portions together form the shape of the most bottom portion (P5). The sides of the acoustic panel 4 can have an inward tilt, such as at least 20 degrees. The body 7 of the acoustic panel can also be a square and flat on the bottom.

Figure 7:
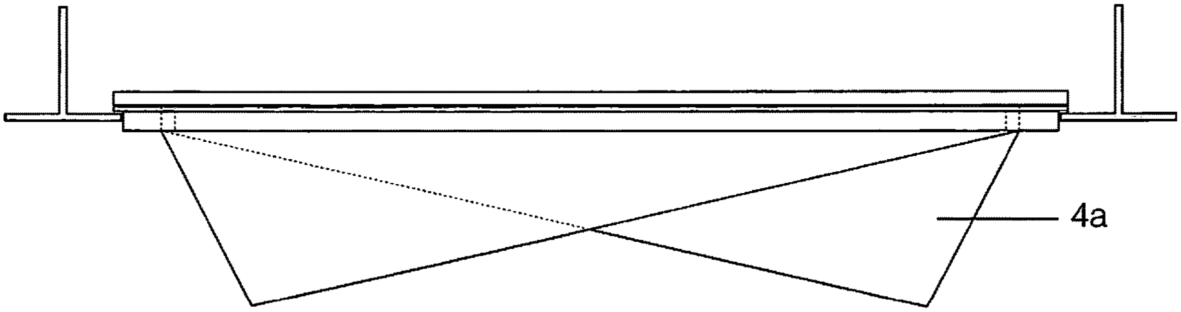
FIG. 7 illustrates a side view of the acoustic panel with a second design.

FIG. 7 illustrates a side view of the acoustic light fixture where the acoustic panel 4*a* has a different shape than the one in FIG. 4.

Figure 8:
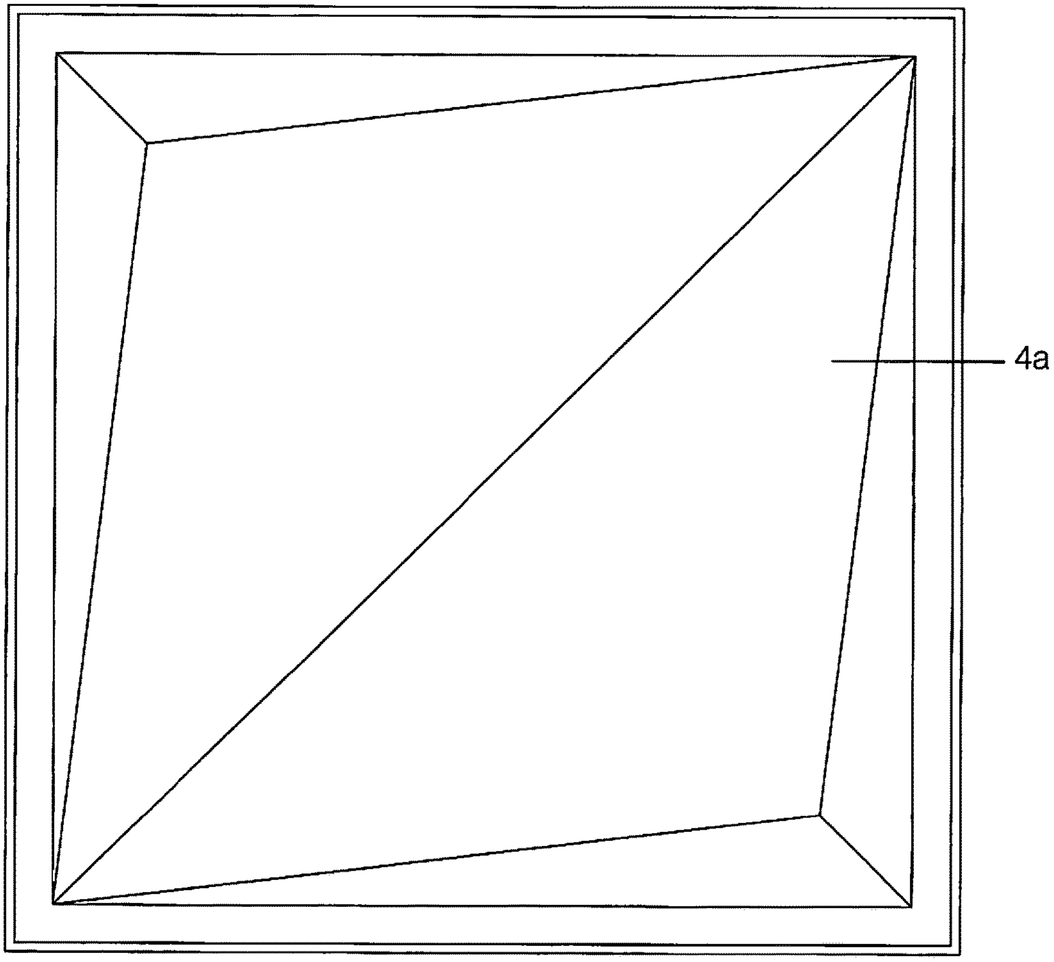
FIG. 8 illustrates a bottom view of the acoustic panel with a second design.
Figure 9:
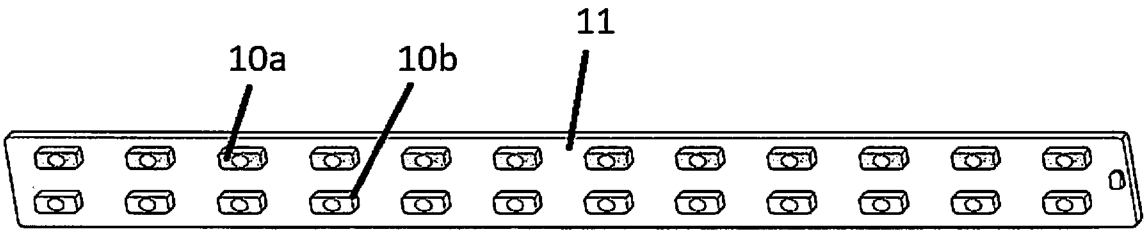
FIG. 9 illustrates an LED board with multi-colored LEDs.

FIG. 8 illustrates a bottom view of the acoustic light fixture with an acoustic panel 4*a* made from 6 straight lined portions. The acoustic panel 4*a* has three portions on each side that are mirror images of each other. The two middle portions share a straight-line border, and are triangles, and dent at their border, creating an acoustic panel 4*a* that has two sides that come further down.

The acoustic panel 4 has a back support 5 that rests on the T-bar 1 or the back support 3 of the frame 2. The acoustic panel 4 has a vertical portion 6 that fits inside the opening of the T-Bar 1 and has smaller width than the back support 5. The vertical portion 6 connects the back support 5 to the body 7 of the acoustic panel 4. Frame 2 is placed around the vertical portion 6 of the acoustic panel 4. The sides of acoustic panel 4 (body 7*a*) can have an inwardly angle to minimize blockage of light from the light source.

An LED board is placed above the lens 8. The LED board can have multiple colors of LEDs, (10*a* and 10*b*), and produce light with one of the LEDs or both for a combined colored light.

1. T-bar
2. Frame
3. Back Support (frame)
4. Acoustic Panel (4*a*—acoustic panel with different design)
5. Back support (acoustic panel)
6. Vertical portion
7. Body (acoustic panel) (7*a*. different design)
8. Lens
9. Blank
10. LED
11. LED Board

What is claimed is:

1. An acoustic light fixture comprising:
a. an acoustic panel with a rectangular or square profile configured to be attached to a T-bar;
b. a frame with light sources configured to be placed around the acoustic panel;
wherein the frame with the light sources emits light from all four sides of the acoustic panel;
further comprising a first back support for the acoustic panel and a second back support for the frame, wherein the first and the second back supports are configured to be placed above the T-Bar; and
wherein the second back support is placed immediately above the frame.

2. The acoustic light fixture of claim 1, wherein the acoustic panel is a square.

3. The acoustic light fixture of claim 1, wherein the light sources are LED light sources.

4. The acoustic light fixture of claim 1, wherein the frame comes below the T-bar to a maximum of 3 inches in a vertical direction.

5. The acoustic light fixture of claim 1, wherein the acoustic panel arranged to extend beyond the frame in a direction away from the T-bar.

6. The acoustic light fixture of claim 1, wherein the acoustic panel has a body comprised of a plurality of portions with straight sides.

7. The acoustic light fixture of claim 1, wherein the acoustic panel is made from wool, fiber glass, cellulose, or foam.

8. The acoustic light fixture of claim 1, wherein the first and the second back supports have a longer width on all four sides in a horizontal direction than a rectangular opening created by the T-bar.

9. The acoustic light fixture of claim 8, wherein the second back support is placed in between a body of the acoustic panel and the first back support.

10. The acoustic light fixture of claim 1, wherein the first and the second back supports are in form of a ledge.

11. The acoustic light fixture of claim 10, wherein the first back frame and a body of the acoustic panel are joined together through a vertical portion.

12. The acoustic light fixture of claim 11, wherein the frame is placed around the vertical portion of the acoustic panel.

13. An acoustic light fixture comprising:
a. an acoustic panel with a square profile configured to be attached to a T-bar, the acoustic panel having a first back support defining a ledge, a body, and a vertical portion connecting the ledge and the body;
b. a square frame with light sources configured to be placed around the vertical portion;
wherein the frame with the light sources emits light from all four sides of the acoustic panel;
further comprising a second back support for the frame, wherein the first and the second back supports are configured to the placed above the T-Bar;
wherein the back support for the frame is placed in between the body and the first back support.

14. The acoustic light fixture of claim 13, wherein the first and the second back supports have a longer width on all four sides in a horizontal direction than a rectangular opening created by the T-bar.

15. An acoustic light fixture comprising:
a. an acoustic panel with a rectangular or square profile configured to be attached to a T-bar;
b. a frame with light sources configured to be placed around the acoustic panel to emit light from all four sides of the acoustic panel; and
c. at least one of:
the acoustic panel arranged to extend beyond the frame in a direction away from the T-bar, or
the acoustic panel has a body comprised of a plurality of portions with straight sides.

16. The acoustic light fixture of claim 15, wherein the acoustic panel arranged to extend beyond the frame in a direction away from the T-bar.

17. The acoustic light fixture of claim 15, wherein the acoustic panel has a body comprised of a plurality of portions with straight sides.

* * * * *